United States Patent [19]

Frey

[11] 4,436,228

[45] Mar. 13, 1984

[54] KEG TAPPING APPARATUS HAVING IMPROVED RETAINER

[75] Inventor: John A. Frey, Orange, Conn.

[73] Assignee: Hoff-Stevens, Inc., Ansonia, Conn.

[21] Appl. No.: 348,961

[22] Filed: Feb. 16, 1982

[51] Int. Cl.[3] ........................ F16K 35/00; F16L 37/28

[52] U.S. Cl. ................................ 222/400.7; 285/329; 285/361; 285/422; 403/404

[58] Field of Search ............... 285/329, 360, 361, 396, 285/422; 403/348, 349, 404; 428/614, 615; 222/400.7, 400.8

[56] References Cited

U.S. PATENT DOCUMENTS

| | | | |
|---|---|---|---|
| 617,591 | 1/1899 | Miller et al. | 285/361 X |
| 2,210,357 | 8/1940 | Beament | 428/682 X |
| 4,159,102 | 6/1979 | Fallon et al. | 222/400.7 X |
| 4,363,336 | 12/1982 | Cerrato | 222/400.7 X |

*Primary Examiner*—David A. Scherbel
*Attorney, Agent, or Firm*—McCormick, Paulding & Huber

[57] ABSTRACT

A keg tapping apparatus includes a keg unit secured within the neck of a keg by a retainer and a tavern unit coupled to the keg unit by the retainer. An operating handle opens valves associated with the keg unit to establish fluid communication between the keg and fluid inlet and outlet fittings on the tavern unit. The retainer has a body which includes a generally cylindrical bore and notches which communicate with the bore. Complementary inserts received within the notches are integrally attached to the body and define coupling lugs which project into the bore for coupling connection with the tavern unit. The inserts are made from a harder material than the body.

3 Claims, 11 Drawing Figures

KEG TAPPING APPARATUS HAVING IMPROVED RETAINER

BACKGROUND OF THE INVENTION

This invention relates in general to apparatus for tapping a container of fluid, such as a keg of beer, and deals more particularly with an improved keg tapping apparatus of the type which includes a keg unit for attachment to a keg and a tavern unit for releasable coupling to the keg unit to establish tapping connection with the keg. Apparatus of the type with which the present invention is concerned is illustrated and described in U.S. Pat. Nos. 4,159,102, to Fallon et al for LOCKING MECHANISM FOR COUPLER AND VALVE ASSEMBLY, issued Jan. 26, 1979, and 4,181,143, to Fallon for VALVE ASSEMBLY AND COUPLER THEREFOR, issued Jan. 1, 1980.

Such tapping apparatus includes a keg unit which is received within a tapping opening in a container, such as the neck of a keg, and held in the tapping opening by a retainer which also functions to couple the keg unit to an associated tavern unit. The retainer has a cylindrical bore and integral coupling lugs which project into the bore and cooperate with a coupling part of the tavern unit to releasably connect the tavern unit in coupled relation to the keg unit. These coupling lugs often become bent from repeated coupling of the keg unit to apparatus used to fill, clean or tap the keg and must be straightened when damaged. Such lug damage often occurs in the field, where the most expedient method for straightening the bent lugs is to pound them back into position. Repeated bending and straightening of the lugs ultimately leads to lug failure. When a lug on a full keg fails or is broken in the field it is usually necessary to return the full keg to the distributor, since a proper tapping connection cannot be established between a tavern unit and a keg unit which has one or more broken coupling lugs. This condition is likely to cause serious inconvenience resulting in customer dissatisfaction. The present invention is primarily concerned with this problem.

SUMMARY OF THE INVENTION

A keg retainer made from one material has a generally cylindrical body, a bore which extends coaxially through the body, and a plurality of slots formed in the body which communicate with the bore. The retainer further includes a plurality of inserts made from another material and equal in number to the slots. Each insert is received within and generally complements an associated one of the slots. Each insert defines an associated coupling lug which projects generally radially into the bore. Means is provided for retaining the inserts in integral assembly with the body.

DETAILED DESCRIPTION OF PREFERRED EMBODIMENT

Figure 1:
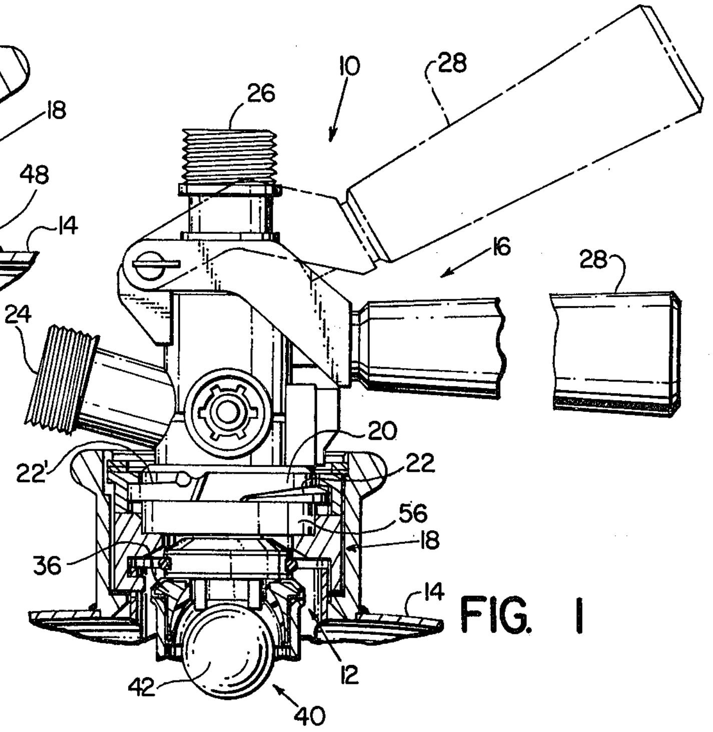
FIG. 1 is a fragmentary side elevational view of a keg unit embodying the present invention, shown positioned within the neck of a keg and coupled to an associated tavern unit, the keg unit and neck being shown in axial section.
Figure 3:
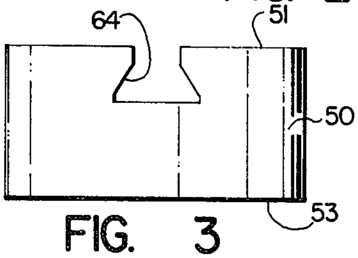
FIG. 3 is a somewhat enlarged side elevational view of the body of the retainer shown in FIGS. 1 and 2.
Figure 5:
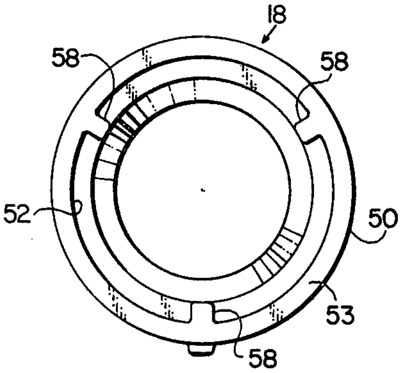
FIG. 5 is a bottom view of the retainer shown in FIGS. 1 and 2.

Turning now to the drawing and referring first particularly to FIG. 1, a keg tapping apparatus embodying the present invention is indicated generally by the reference numeral 10. The tapping apparatus 10 essentially comprises a keg unit indicated generally at 12 and shown attached to a keg 14 and a tavern unit 16 releasably coupled to the keg unit 12. The present invention is particularly concerned with an improved retainer indicated generally at 18, which comprises a part of the keg unit 12 and which functions as both a retaining member for securing the tavern unit in assembly with the keg 14 and a coupling member for establishing a coupling connection with the tavern unit 16, all of which will hereinafter further discussed. However, before further considering the improved retainer the overall structure and function of the tapping apparatus 10 will be generally discussed.

Further referring to FIG. 1, the tavern unit has a coupling portion 20 which includes inclined ramp surfaces 22, 22' for cooperating with coupling lugs on the retainer 18 to releasably secure the tavern unit 16 in coupled engagement with the keg unit 12. The tavern unit 16 further includes a gas inlet fitting 24, a liquid outlet fitting 26, and a handle 28 movable between active and inactive positions, respectively indicated in full and broken lines, for moving a central probe assembly 29 to operate valves associated with the tavern unit 12 and connect the gas inlet fitting 24 and the liquid outlet fitting 26 in communication with the interior of the keg 14 whereby gas under pressure may be introduced into the keg through the gas inlet fitting 24 and liquid, such as beer, discharged from the keg through the liquid outlet fitting 26.

Figure 2:
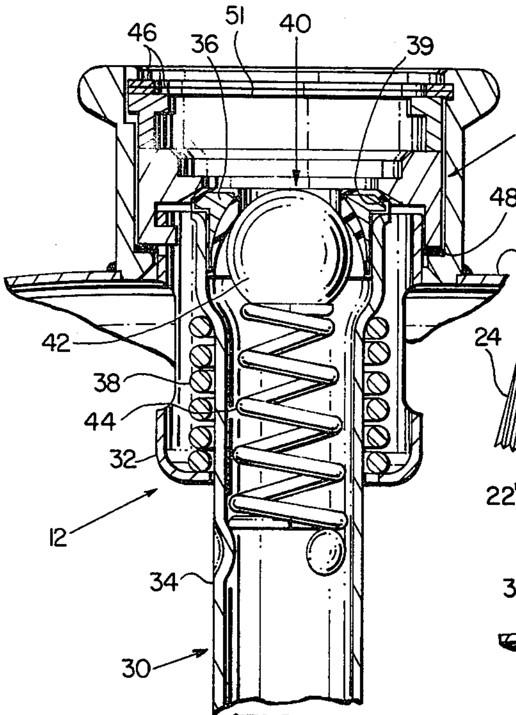
FIG. 2 is a somewhat enlarged axial sectional view through the keg unit and keg of FIG. 1.

Referring now particularly to FIG. 2, the keg unit 12 essentially comprises a valve assembly which includes the retainer 18, a siphon tube assembly indicated generally at 30 and a cage 32 connecting the siphon tube assembly to the retainer 18. The siphon tube assembly 30 includes a siphon tube 34 which has an elastomeric seating element 36 at its upper end. The siphon tube extends from the retainer to a position adjacent the bottom of the keg 14 to provide a conduit through which liquid, such as beer, may be discharged from the keg. A spring 38 which surrounds an upper portion of the siphon tube 34 acts between the siphon tube and the cage 32 to bias the seating element 36 into engagement with a seating surface 39 on the retainer 18. The siphon tube assembly 30 further includes a ball check valve assembly indicated generally at 40 which includes a ball 42 and a spring 44 which biases the ball upwardly into engagement with an associated seating surface on the seating element 36, as shown in FIG. 2. The keg unit 16 is retained in assembly within a cylindrical opening in the neck of the keg 14 by retaining rings 46, 46 engaged within a radially inwardly opening annular groove in the keg neck. An O-ring seal 48 provides a fluid tight connection between the neck and a bearing surface 53 on the retainer 18, as shown in FIG. 2.

When the keg unit 16 is coupled to the tavern unit 12 and the operating handle 28 is moved to its active or full line position of FIG. 1 the central probe assembly 29 on the tavern unit moves the ball check valve 40 to and maintains it in an open position to establish fluid connection between the siphon tube 34 and an outlet fitting 26. The central probe assembly also unseats the seating element 36 from the seating surface 39 to provide a passageway for the flow of gas under pressure into the keg 14 from a gas inlet fitting 24 on the tavern unit whereby gas under pressure may be introduced into the keg 14 to force liquid out of the keg through the siphon tube 34 and the outlet fitting 26. A more complete disclosure of a tapping apparatus, such as the apparatus hereinbefore described, is found in the aforementioned U.S. patents to Fallon and Fallon et al which are hereby adopted by reference as part of the present disclosure.

Considering now the improved retainer 18 in further detail and referring particularly to FIGS. 3–10, the retainer has a generally cylindrical body 50 which defines the bearing surfaces 51 and 53 and includes a coaxial bore 52 which extends therethrough. An integral annular portion of the body projects radially to a central part of the bore 52 and defines the downwardly facing seating surface 39 and an upwardly facing seating surface 54 which cooperates in sealing engagement with an annular sealing member 56 carried by the tavern unit 16 and best shown in FIG. 1. A plurality of equangularly spaced integral lugs 58, 58 formed on the lower end portion of the body 50 project radially into the bore 52. The lugs 58, 58 are adapted to be received within bayonet slots in the cage 32 to retain the cage in assembly with the retainer 18. A typical bayonet slot is indicated at 62 in FIG. 11.

A plurality of notches are formed in the body 50 and open upwardly through the upper bearing surface 51 and into the bore 52. The notches may vary in number and in form, but preferably, and as shown, the retainer body 50 has two diametrically opposed notches 64, 64 which are generally dovetailed and which converge upwardly toward the bearing surface 51.

Figure 7:
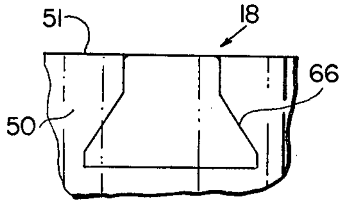
FIG. 7 is a somewhat enlarged fragmentary side elevational view of the retainer shown in FIGS. 1 and 2 and shows one of the inserts.
Figure 8:
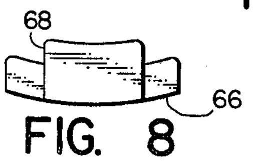
FIG. 8 is a plan view of the insert shown in FIG. 7.

An insert, is positioned in each notch 64. A typical insert indicated at 66 in FIGS. 7 and 8, is shaped to substantially complement a dovetailed notch 64 within which it is received. The insert 66 further defines a coupling lug 68 which projects radially into the bore 52 when the insert 66 is assembled with the retainer body 50.

In accordance with the invention, the retainer body 50 is made from one material and each insert is made from another material, which is preferably harder than the material from which the retainer body is made. The illustrated retainer body 50 is made from brass whereas the inserts are made from hardened steel. In accordance with another preferred embodiment of the invention the retainer 18 is made from stainless steel and the inserts are made from hardened steel. The inserts are brazed or welded to the retainer body 50 and become an integral part of it.

Figure 10:
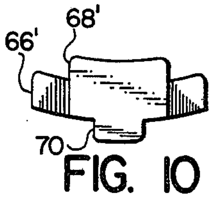
FIG. 10 is plan view of the insert shown in FIG. 9.
Figure 9:
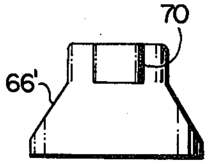
FIG. 9 is a somewhat enlarged side elevational view of the other insert.
Figure 4:
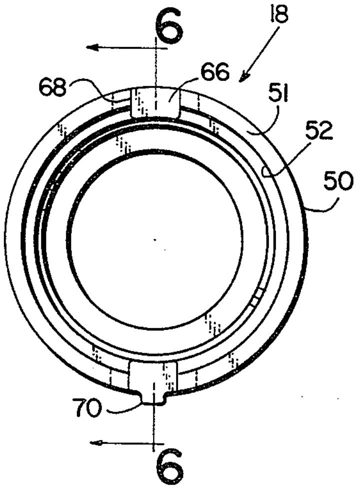
FIG. 4 is a plan view of the retainer shown in FIGS. 1 and 2.
Figure 6:
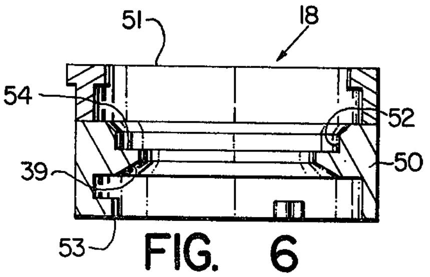
FIG. 6 is a sectional view taken along the line 6—6 of FIG. 4.
Figure 11:
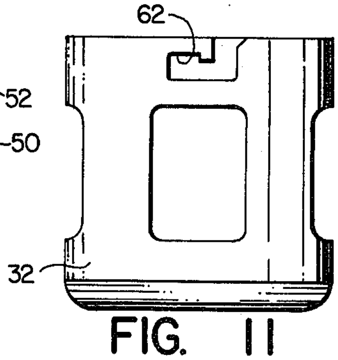
FIG. 11 is a side elevational view of the cage shown in FIG. 2.

Each insert may be identical to the other, however, the illustrated retainer 18 has one insert of the type shown in FIGS. 9 and 10, indicated at 66′, and which includes a lug 68′ and an outwardly projecting key 70. The key is arranged for registry with a bayonet recess in the neck of the keg 14. The key cooperates with the bayonet recess to hold the retainer in position within the neck the enable insertion of the locking ring 46, 46 which hold the keg unit 16 in assembly with the keg 14.

Although the retainer body 50 may be made from a relatively soft material, such as brass, its configuration is such that it is quite resistive to deformation when positioned within the neck of a keg. Thus, the provision of somewhat harder inserts such as the inserts 66 and 66′ which define the coupling lugs 68, 68′ result in a structure with lugs 68, 68′ which are quite resistive to bending or deformation. This arrangement substantially prolongs the life of the keg unit and reduces risk of coupling lug failure in the field.

I claim:

1. In a tapping apparatus for a keg having a neck, the tapping apparatus including a tavern unit and a keg unit, the keg unit including a generally cylindrical retainer for positioning within the neck and having an outwardly opening coaxial bore, said retainer having a plurality of coupling lugs projecting into the bore, the tavern unit having a coupling member received within the bore and coupled to the keg unit by engagement with the coupling lugs, the improvement comprising said retainer having a generally cylindrical body defining said bore and made from one material, said body having an annular bearing surface at its outer end and a plurality of notches therein communicating with said bore, each of said notches extending radially through said body and opening outwardly through said bearing surface, each of said notches having a dovetailed inner end portion converging outwardly toward said bearing surface, a plurality of inserts equal in number to said notches and made from another material harder than said one material, each of said inserts received within and generally complementing an associated one of said notches, each of said inserts defining an associated one of said coupling lugs and a portion of said bearing surface, and means for retaining said inserts in integral assembly with said body.

2. In a keg tapping apparatus as set forth in claim 1 the further improvement wherein said one material is brass and said other material is steel.

3. The combination comprising a keg having an outwardly opening neck, a valve assembly disposed within said neck and including a siphon tube extending into the keg and terminating near the bottom thereof, a generally cylindrical retainer coaxially received within said neck, said retainer seated on said valve assembly and retaining said valve assembly in assembled relation with said keg, and means for maintaining said retainer in assembly with said neck, said retainer having a generally cylindrical body made from one material and including a bore extending coaxially therethrough, said body having an annular bearing surface coaxially surrounding the outer end of said bore, said body having a plurality of notches extending radially therethrough, each of said notches opening through said annular bearing surface and into said bore, each of said notches having an outer end portion and a dovetailed inner end portion converging outwardly toward said bearing surface and terminating at a junction with said outer end portion, and a plurality of inserts equal in number to said notches, said inserts being made from another material harder than said one material, each of said inserts received within an associated one of said notches and having an inner end part complementing said inner end portion of said one notch and an outer end part complementing the outer end portion of said one notch, said outer end part defining a coupling lug projecting into said bore and a portion of said bearing surface, and means for securing each of said inserts in integral assembly with said body.

* * * * *